United States Patent Office 3,024,601
Patented Mar. 13, 1962

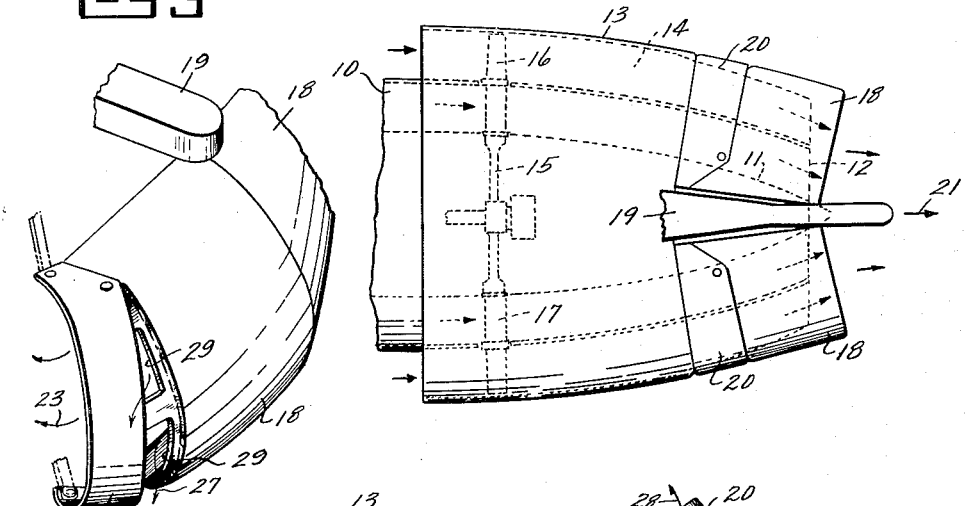
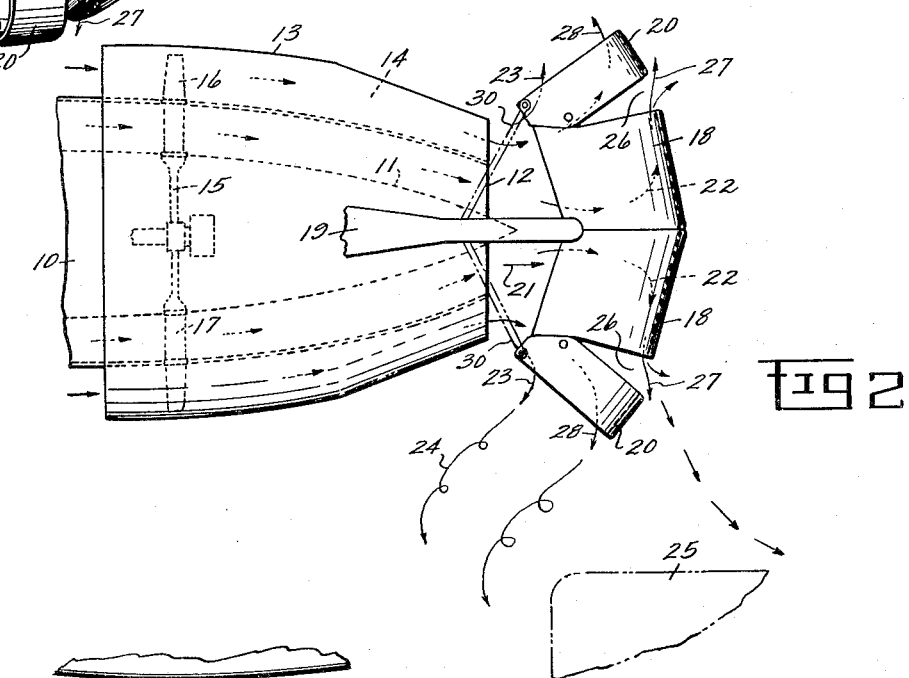
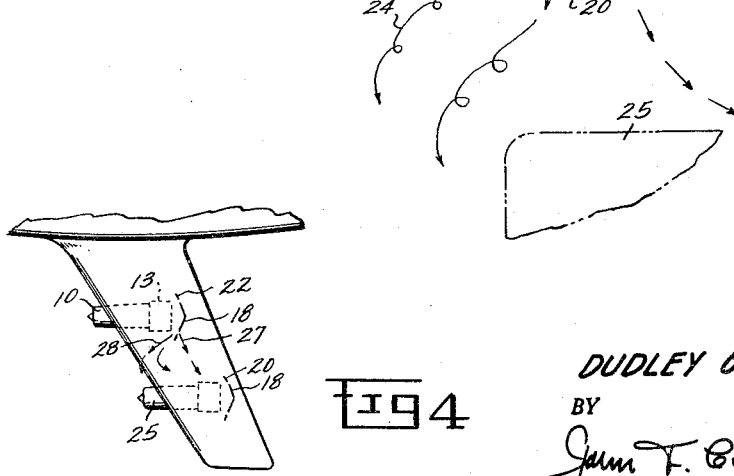

3,024,601
THRUST SPOILER AND REINGESTION CONTROL
Dudley O. Nash, Cincinnati, Ohio, assignor to General Electric Company, a corporation of New York
Filed Apr. 12, 1960, Ser. No. 21,801
7 Claims. (Cl. 60—35.54)

The present invention relates to a thrust spoiling and reingestion control for a jet engine and, more particularly, to a thrust spoiler and/or reverser and reingestion control for a dual flow or fan type jet engine.

In present day jet engine aircraft, thrust reversing means are provided as required equipment in order to slow down the aircraft on landing without putting undue strain on the undercarriage and brakes. Thrust reversing is equivalent to the reversible pitch propellers on piston engine aircraft. Various types of thrust reversing mechanisms have been designed and are in use with varying degrees of success and life. All of them are designed to reduce the thrust of the engine by directing it away from the line of thrust and, in the most practical application, directing it forwardly so that a component of thrust is obtained in the opposite or forward direction to slow down the aircraft. In multi-engine aircraft which are in commercial use today, a problem is created by the reingestion of the exhaust by the engines. In this sense "adjacent" is intended to include the particular engine swallowing its own exhaust. Due to the swept back wings of the aircraft, the inboard engines are considerably forward of the outboard engines on aircraft wherein the wings carry the engines. Thus, on a typical wing the exhaust of the inboard engine is very close to the inlet of the outboard engine. Consequently, when the thrust reversers are in action and the exhaust gas is directed forwardly from the inboard engine, it can be easily reingested by the outboard engine especially at lower rolling speeds resulting in compressor stall and poor operation of the outboard engine. This is an undesirable condition and may be remedied by proper directing of the reverse thrust to cause the hot gases to miss the inlet of the outboard engine. Further, the exhaust thrust must be split and the two streams directed symmetrically away from the line of thrust to achieve balanced conditions. Directing the flow downwardly is unsatisfactory since it reflects off the runway and is reingested by the engine and may carry debris into the engine. Obviously, it cannot be directed upwardly on engines that are slung beneath the wings since the hot gases would adversely affect the wing structure as well as interferring with aerodynamic flow.

The next generation of jet engines promises to be the fan engines in which much larger quantities of air are employed at lower velocities. One such type employs a central hot gas exhaust from the usual jet engine which is surrounded by casing at the aft part of the engine, the casing being spaced outside the engine envelope and containing a fan for the movement of cool by-pass air to increase the mass flow. The diameter of such powerplants is considerably greater resulting in more bulky engines and increased problems in thrust reversal and reingestion. Since the engines are larger, the thrust reverser is larger and consequently the envelope of reversed fluids covers a larger area to more easily include adjacent engine inlets.

The main object of the present invention is to provide a thrust spoiling and reingestion control for dual flow engines to direct the engine exhaust so as not to interfere with adjacent powerplants.

Another object is to provide such a thrust spoiling and reingestion control which separates the exhaust into hot and cold fluids so that any reingestion by an engine is of unobjectionable cool fluid.

A further object of the invention is to provide a thrust spoiling and reingestion control which also provides reversed thrust by a cool stream and directs a separate hot stream away from the cool system to avoid reingestion.

Briefly stated, my invention consists in providing a thrust reverser with target type blocker doors that are designed to be moved from a stowed inoperative position parallel to the fluid flow to a transverse fluid intercepting position downstream of the engine to direct the flow away from the line of thrust. Each blocker door is provided with a control flap at its outer extremity which is movable relative to the door to divide the stream being turned by the door into a pair or more of separate streams diverging from the line of thrust. The control flap may uncover slots in the blocker door or may open a slot between itself and the blocker door to "peel off" and direct the hot flow adjacent to and following the blocker door.

While the specification concludes with claims particularly pointing out and distinctly claiming the subject matter which I regard as my invention, it is believed the invention will be better understood from the following description taken in connection with the accompanying drawing in which:

FIG. 1 is a partial view of a dual flow engine showing the thrust spoiling and reingestion control means in the inoperative position.

FIG. 2 is a view similar to FIG. 1 schematically showing the reverser and reingestion control in the operative position with the separate streams of flow.

FIG. 3 is a partial view showing a modified form employing slots in the blocker door, and FIG. 4 is a partial view of an aircraft wing showing plural engines and the direction of the flow paths using the instant invention.

Referring first to FIG. 1, there is shown the downstream end of a dual flow reaction engine of the fan type. For purposes of description, the aft fan is described although the invention is applicable to other fan or coaxial flow engines. In this figure the normal tail pipe is shown at 10 having an inner tail cone 11 and exhausting hot combustion gas downstream at 12 all in the conventional manner. In order to increase the thrust and operate at better specific fuel consumption, the aft fan type of engine has been created and this merely surrounds the conventional jet engine with a casing 13 to create a by-pass duct 14 through which cool ambient air is pumped by means of free fan 15 having fan blades 16 mounted on the periphery of and driven by turbine buckets 17 which, in turn, are driven by the exhaust through tail pipe 10. A large mass of cool air is pumped through by-pass duct 14 to exhaust at the downstream end of casing 13 surrounding the inner core of hot gas or flow from tail pipe 10.

In such a powerplant, it is necessary to spoil the thrust on landing and it is also desirable to obtain braking action by reversing the flow. It has been common to provide target type doors to intercept the flow and direct it to the side and forwardly and, it is this general type of mechanism that is used herein with modifications. Disposed on the downstream end of the casing is a pair of symmetrical blocker doors 18 that are smoothly faired into the casing 13 when in the stowed position as shown in FIG. 1. Thus, no impediment to fluid flow either within the casing or outside of the casing is created by the blocker doors in the position shown. As shown, they merely provide an extension to casing 13. These doors may be supported on casing 13 by any suitable means as diagrammatically shown by linkage 19. Linkage 19 is merely representative of a suitable means to support and fix the doors in the positions shown in FIGS. 1 and 2 as nested or faired against casing 13 and also to move these doors into their operative position as will be explained. For the purpose of later splitting the flow, each blocker door 18 is equipped at its outer extremity with a control flap 20 which also nests into a smoothly faired position preferably overlapping door 18 and preferably supported on door 18 although it is not necessary that it be supported directly on door 18 but it may be supported by suitable linkage 30 (in phantom) from the casing.

When thrust spoiling or reverse thrust is desired, suitable actuating means connected to or forming part of linkage 19 operate to move doors 18 into an operative position transverse to the line of flow 21 and intercepting the flow as shown in FIG. 2. Preferably the mechanism is designed so that the blocker doors forming the target type reverser are spaced downstream from the outlet of casing 13 a desired distance. A typical mechanism suitable for this is shown by Dudley O. Nash in application Serial Number 860,590 filed December 18, 1959, and assigned to the assignee of the instant invention.

In the diagrammatic showing in FIG. 2, it can be seen that the hot inner fluid from tail pipe 10 is split into two streams and directed to the side of the engine. In this sense "side" is merely away from the engine and contemplates up and down. Since each stream is the same, only one will be described. The hot fluid is shown by arrow 22 following the inner surface of blocker door 18 which, as shown, is canted to direct the air forwardly and provide a component of thrust in the forward direction and thus provide reversed thrust. The amount of cant and reverse thrust is, of course, a matter of choice and design. The relatively cool air represented by the bypass flow is also turned with the hotter central exhaust and directed forwardly as shown by arrow 23. As thus far described the structure, with the exception, of control flap 20, is conventional and the two streams 22 and 23 mix as they are directed by the blocker doors to create a turbulent region 24 which is the cause of reingestion problems since this is relatively warm air that cannot be tolerated by the adjacent engines. Such normal path as described is shown at arrow 24 which represents the mixed flow directed forward of the inlet of the adjacent engine shown in phantom at 25.

In order to avoid this undesirable condition, I provide each blocker door, adjacent its outer end, with control flaps 20 as mentioned in connection with FIG. 1. Control flap 20 serves two important functions. First, it may assist in further turning the flow in a forward direction to get increased thrust reversal and second, it is important in the control of reingestion for adjacent engines. To this end, control flap 20 is designed to open a predetermined slot 26 through which the hot central gases of arrow 22 are "peeled off" as the flow curves along the inner surface of the blocker door 18. At this point the two streams 22 and 23 are still separate or laminated so that it is possible, with this control flap 20, to strip off the hot stream and direct it as shown by arrow 27 away from the inlet of adjacent engine 25. In the meantime, the relatively cool by-pass air shown by arrow 28 continues in the stream forwardly to provide reverse thrust. In the event that air 28 is reingested by the adjacent engine 25, it should be appreciated that it is cool air which can easily be handled by the engine without compressor stall. Thus, control flap 20 splits the exhaust stream into hot and cool diverging streams 27 and 28 which are directed away from the line of thrust 21 and the structure may be designed to direct these two streams in any desired direction compatible with the position of adjacent engines. The amount of opening designed for slot 26 will pre-determine how much of the hot gas is bled into the direction of stream 27.

In FIG. 2 it was diagrammatically shown that control flap 20 merely opened a gap or slot between itself and blocker door 18. A more controlled arrangement is shown in FIG. 3 wherein the outer portion of blocker door 18 is provided with slots 29 which may take any suitable shape, size and quantity or flexibility in the bled gas. In this form, control flap 20 is merely designed to overlap slots 29 when in the stowed position as shown in FIG. 1 and to uncover the slot means to bleed or "peel off" the hot stream as shown in FIG. 3.

The partial view shown in FIG. 4 illustrates a typical airplane wing employing two jet engines and illustrating the direction of the diverging streams from a single engine. It can be seen that hot stream 27 can be directed to the pod or side of the adjacent engine 25 to avoid any reingestion of hot objectionable gas and the cool bypass flow 28 may be directed forwardly for reverse thrust and unobjectionable reingestion if such occurs. It is also to be noted that it is quite possible that the proper selection and sizing of slots 26 or 29 may balance the loss and thrust. In other words, any bleeding of the flow that normally passes forward by arrow 28 results in the loss of reverse thrust. Thus, bleeding at 27 represents a loss in thrust reversal if it is in the direction shown in FIG. 4. However, the greater turning obtained by moving control flap 20 forward to obtain the bleeding as shown in FIG. 2 may be designed to offset the loss of thrust since arrow 28 is then directed more forwardly to give a larger component of forward thrust. Thus the loss of thrust by bleed may be balanced by the larger turning obtained by control flap 20 by rotating it forward more to open up slots 26 and 29.

By the addition of the control flaps 20, it can be seen that reingestion control is obtained and directional control is obtained as well as a splitting of the exhaust flow to separate the objectionable hot flow from the unobjectionable cool flow and so direct the two streams that the engines do not encounter the reingestion problem. It should also be pointed out that the thrust spoiler heretofore described is equally applicable in controlling reingestion in single engine applications where reingestion of its own exhaust flow which is deflected forward by a thrust reverser is possible.

While I have hereinbefore described a preferred form of my invention, obviously many modifications and variations of the present invention are possible in the light of the above teachings. It is therefore to be understood that within the scope of the appended claims, the invention may be practiced otherwise than as specifically described.

I claim:

1. Thrust spoiling and reingestion control means for a dual flow reaction engine having a hot inner exhaust, a casing confining a cool outer by-pass flow surrounding the inner flow comprising, a pair of symmetrical blocker doors mounted for movement between an inoperative stowed position faired into said casing and substantially parallel to the flow and an operative position transverse to and intercepting the flow to divide it into dual streams directed away from the line of thrust, and a control flap mounted on the outer end of each door canted relative to and spaced from the door to split each stream into diverging streams directed away from the line of thrust and provide a substantial component of forward motion to the cool outer flow.

2. Apparatus as described in claim 1 wherein the blocker doors are mounted on the casing, and each control flap is smoothly faired into its door when in stowed position and is spaced downstream of the engine when in operative position.

3. Thrust reverse and reingestion control means for a dual flow reaction engine having a hot inner exhaust, a casing confining a cool outer by-pass flow surrounding the inner flow comprising, a pair of symmetrical blocker doors mounted on said casing and movable between an inoperative stowed position faired into said casing and substantially parallel to the flow and an operative position transverse to and intercepting the flow and canted to divide the flow into dual streams directed away from the line of thrust and forwardly for reverse thrust, and a control flap pivotally mounted on and spaced from the outer end of each door and canted relative to the door to split the stream into hot and cool diverging streams directed away from the line of thrust and provide a substantial component of forward motion to the cool stream.

4. Apparatus as described in claim 3 wherein the outer portion of the blocker doors is provided with slot means therethrough, and the movement of the control flap relative to the door uncovers the slot means to bleed off fluid adjacent to the door surface as the hot diverging stream.

5. Thrust reverse and reingestion control means for a dual flow reaction engine having a hot inner exhaust, a casing confining a cool outer by-pass flow surrounding the inner flow comprising, a pair of blocker doors symmetrical about the engine center line, mounted on said casing and rotatable between an inoperative stowed position faired into said casing at the downstream end thereof and substantially parallel to the flow, and an operative position spaced downstream of the casing and transverse to and intercepting the flow to divide the flow into equal dual streams, each door being canted to direct each stream forwardly to provide reverse thrust and a control flap pivotally mounted on the outer end of each door, spaced from said door and rotatable relative to the door to split the stream into predetermined hot and cool diverging streams directed away from the line of thrust by deflecting the cool stream in a substantial forward direction.

6. Apparatus as described in claim 5 wherein the outer portion of each blocker door is provided with a predetermined slot means therethrough, said control flap overlapping said slot means in stowed position, and the rotation of the control flap on said door uncovers said slot means to bleed off fluid adjacent to the door surface as the hot diverging stream.

7. Thrust reverse and reingestion control means for a dual flow reaction engine generating a propulsive gas stream comprising a hot inner core flow and a cooler outer annulus flow, a casing confining said flows, a plurality of blocker doors mounted for movement between a forward thrust position and a reverse thrust position transverse to said propulsive gas stream and intercepting at least said hot inner core flow to redirect it generally transversely of the engine axis, a plurality of control flaps disposed adjacent the outer extremities of said blocker doors when in said reverse thrust position and canted substantially forwardly with respect thereto to intercept said cooler outer annulus flow and provide a substantial component of forward motion thereto to produce reverse thrust, said control flaps being so spaced from the adjacent blocker doors as to permit unrestricted passage of the hot inner core flow deflected by said blocker doors outwardly between the doors and flaps.

References Cited in the file of this patent

UNITED STATES PATENTS

| | | |
|---|---|---|
| 2,847,823 | Brewer | Aug. 19, 1958 |
| 2,943,443 | Voymas et al. | July 5, 1960 |

FOREIGN PATENTS

| | | |
|---|---|---|
| 1,150,555 | France | Aug. 12, 1957 |
| 774,502 | Great Britain | May 8, 1957 |
| 812,167 | Great Britain | Apr. 22, 1959 |